(12) United States Patent
Chapman et al.

(10) Patent No.: US 10,822,966 B2
(45) Date of Patent: Nov. 3, 2020

(54) THERMAL BARRIER SYSTEM WITH BOND COAT BARRIER

(71) Applicant: General Electric Company, Schenectady, NY (US)

(72) Inventors: Julie Marie Chapman, West Chester, OH (US); Robert Eckert, Liberty Township, OH (US); Nripendra Nath Das, West Chester, OH (US)

(73) Assignee: General Electric Company, Schenectady, NY (US)

( * ) Notice: Subject to any disclaimer, the term of this patent is extended or adjusted under 35 U.S.C. 154(b) by 138 days.

(21) Appl. No.: 15/149,348

(22) Filed: May 9, 2016

(65) Prior Publication Data

US 2017/0321559 A1 Nov. 9, 2017

(51) Int. Cl.
*C23C 30/00* (2006.01)
*F01D 5/28* (2006.01)
(Continued)

(52) U.S. Cl.
CPC ............ *F01D 5/288* (2013.01); *C23C 28/042* (2013.01); *C23C 28/044* (2013.01); *C23C 28/321* (2013.01); *C23C 28/3215* (2013.01); *C23C 28/347* (2013.01); *C23C 28/3455* (2013.01); *C23C 30/00* (2013.01);
(Continued)

(58) Field of Classification Search
CPC ..... F01D 5/288; C23C 28/042; C23C 28/044; C23C 28/321; C23C 28/3215; C23C 28/3455; C23C 28/347; C23C 30/00; F05D 2230/90; F05D 2300/2118; F05D 2300/514; F05D 2300/611
See application file for complete search history.

(56) References Cited

U.S. PATENT DOCUMENTS 5,660,885 A 8/1997 Hasz et al.
5,683,825 A 11/1997 Bruce et al.
(Continued)

FOREIGN PATENT DOCUMENTS

EP 1 283 278 A2 2/2003
EP 1 541 712 A1 6/2005
(Continued)

OTHER PUBLICATIONS

Trice et al., "The role of NZP additions in plasma-sprayed YSZ: microstructure, thermal conductivity and phase stability effects", Materials Science and Engineering, vol. A272 (1999) pp. 284-291.*
(Continued)

*Primary Examiner* — Jonathan C Langman
(74) *Attorney, Agent, or Firm* — Dority & Manning, P.A.

(57) ABSTRACT

A coating system disposed on a surface of a substrate is provided. The coating system includes a bond coating on the surface of the substrate, a protective coating on the bond coating, a thermal barrier coating on the protective coating, and a protective agent disposed within at least some of the voids of the thermal barrier coating. The protective coating is constructed from a ceramic material, and the thermal barrier coating defines a plurality of elongated surface-connected voids. Methods are also generally provided for forming such a coating system.

15 Claims, 2 Drawing Sheets

(51) Int. Cl.
  *C23C 28/00* (2006.01)
  *C23C 28/04* (2006.01)
(52) U.S. Cl.
  CPC .. *F05D 2230/90* (2013.01); *F05D 2300/2118* (2013.01); *F05D 2300/514* (2013.01); *F05D 2300/611* (2013.01); *Y02T 50/672* (2013.01); *Y02T 50/6765* (2018.05)

(56) References Cited

U.S. PATENT DOCUMENTS

| | | |
|---|---|---|
| 5,871,820 A | 2/1999 | Hasz et al. |
| 5,876,860 A | 3/1999 | Marijnissen et al. |
| 6,117,560 A | 9/2000 | Maloney |
| 6,177,200 B1 | 1/2001 | Maloney |
| 6,203,927 B1 | 3/2001 | Subramanian et al. |
| 6,306,515 B1 | 10/2001 | Goedjen et al. |
| 6,514,629 B1 | 2/2003 | Rigney et al. |
| 6,890,668 B2 | 5/2005 | Bruce et al. |
| 6,924,040 B2 | 8/2005 | Maloney |
| 7,150,926 B2 | 12/2006 | Strangman |
| 7,255,940 B2 | 8/2007 | Spitsberg et al. |
| 7,282,271 B2 | 10/2007 | Strangman et al. |
| 7,326,468 B2 | 2/2008 | Spitsberg et al. |
| 7,374,825 B2 | 5/2008 | Hazel et al. |
| 7,507,484 B2 | 3/2009 | Kulkarni et al. |
| 7,622,195 B2 | 11/2009 | Schlichting et al. |
| 7,662,489 B2 | 2/2010 | Litton et al. |
| 7,722,959 B2 | 5/2010 | Schlichting et al. |
| 7,780,832 B2 | 8/2010 | Hasz |
| 7,807,231 B2 | 10/2010 | Gorman et al. |
| 7,901,790 B2 | 3/2011 | Arikawa et al. |
| 7,993,704 B2 | 8/2011 | Raybould et al. |
| 8,025,984 B2 | 9/2011 | Stamm |
| 8,062,759 B2 | 11/2011 | Fu et al. |
| 8,080,283 B2 | 12/2011 | Schlichting et al. |
| 8,216,689 B2 | 7/2012 | Witz et al. |
| 8,337,939 B2 | 12/2012 | Striker et al. |
| 8,356,482 B2 | 1/2013 | Duval et al. |
| 8,470,460 B2 | 1/2013 | Lee |
| 8,529,999 B2 | 9/2013 | Maloney et al. |
| 8,658,255 B2 | 2/2014 | Kirby et al. |
| 8,658,291 B2 | 2/2014 | Kirby et al. |
| 9,034,479 B2 | 5/2015 | Nagaraj et al. |
| 9,051,652 B2 | 6/2015 | Neal et al. |
| 9,133,719 B2 | 9/2015 | Witz et al. |
| 9,790,587 B2 | 10/2017 | Nayak et al. |
| 2003/0157361 A1 | 8/2003 | Nagaraj et al. |
| 2003/0207079 A1 | 11/2003 | Subramanian |
| 2004/0115470 A1 | 6/2004 | Ackerman et al. |
| 2004/0170849 A1 | 9/2004 | Ackerman et al. |
| 2005/0013994 A1 | 1/2005 | Strangman |
| 2005/0064213 A1 | 3/2005 | Subramanian et al. |
| 2005/0129869 A1 | 6/2005 | Ackerman et al. |
| 2006/0068189 A1 | 3/2006 | Raybould et al. |
| 2007/0116883 A1 | 5/2007 | Gorman et al. |
| 2007/0119713 A1 | 5/2007 | Hasz |
| 2007/0160859 A1 | 7/2007 | Darolia et al. |
| 2009/0017260 A1 | 1/2009 | Kulkarni et al. |
| 2009/0252985 A1* | 10/2009 | Nagaraj ............ C23C 4/10 428/613 |
| 2009/0308733 A1 | 12/2009 | Maloney et al. |
| 2009/0324989 A1 | 12/2009 | Witz et al. |
| 2010/0081009 A1 | 4/2010 | Nelson et al. |
| 2010/0092842 A1 | 4/2010 | Rose et al. |
| 2010/0242477 A1 | 9/2010 | Duval et al. |
| 2010/0291302 A1* | 11/2010 | Ackerman ............ C23C 28/321 427/343 |
| 2015/0014179 A1 | 1/2015 | Doebber et al. |
| 2015/0167141 A1 | 6/2015 | Rosenzweig et al. |
| 2016/0060752 A1 | 3/2016 | Jacques et al. |
| 2016/0115818 A1 | 4/2016 | Porob et al. |
| 2016/0115819 A1 | 4/2016 | Nayak et al. |
| 2016/0168684 A1* | 6/2016 | Brosnan ............ F01D 5/288 428/305.5 |

FOREIGN PATENT DOCUMENTS

| | | |
|---|---|---|
| EP | 2 108 715 A2 | 10/2009 |
| EP | 2857638 A1 | 4/2015 |
| EP | 3 031 954 A1 | 6/2016 |
| JP | 2002/536543 A | 10/2002 |
| JP | 2012062511 A | 3/2012 |
| JP | 2013129917 A | 7/2013 |
| JP | 2015/501375 A | 1/2015 |
| JP | 2016/113360 A | 6/2016 |

OTHER PUBLICATIONS

Schulz et al., "Degradation of La2Zr2O7 and other novel EB-PVD thermal barrier coatings by CMAS (CaO—MgO—Al2O3—SiO2) and volcanic ash deposits", Surface and Coatings Technology, Science Direct, vol. 235, pp. 165-173, Nov. 25, 2013.

Wang Li et al., "Thermal Cycling and Thermal Radiation Performances of Novel Thermal Barrier Coatings", Electronics Thesis & Dissertation Collection, May 25, 2013.

Kramer et al., "Infiltration-Inhibiting Reaction of Gadolinium Zirconate Thermal Barrier Coatings with CMAS Melts", Journal of the American Ceramic Society, Wiley Online Library, vol. 91, Issue 2, pp. 576-583, Feb. 2008.

H. Zhao et al., "Molten silicate interactions with thermal barrier coatings", Surface and Coatings Technology, Science Direct, vol. 251, pp. 74-86, Apr. 12, 2014.

Cai, L. and Nino, J.C., "Complex ceramic structures. I. Weberites," Acta Crystallographica, Section B, Structural Science, vol. 63, pp. 269-290 (2009).

International Search Report and Written Opinion issued in connection with corresponding PCT Application No. PCT/US2017/31837, dated Aug. 9, 2017.

Machine Translated Japanese Search Report Corresponding to Application No. 2018558402 dated Dec. 10, 2019.

Machine Translated Japanese Office Action Corresponding to Application No. 2018558402 dated Jan. 9, 2020.

Chinese Office Action Corresponding to Application No. 201780028503 dated Apr. 26, 2020.

* cited by examiner

FIG. 1

FIG. 2

THERMAL BARRIER SYSTEM WITH BOND COAT BARRIER

FIELD OF THE INFORMATION

This disclosure generally relates to articles employing thermally protective coatings. More particularly, this disclosure relates to articles employing coatings that are resistant to degradation due to high-temperature interactions with dust materials.

BACKGROUND OF THE INVENTION

Thermal barrier coatings are typically used in articles that operate at or are exposed to high temperatures. Aviation turbines and land-based turbines, for example, may include one or more components protected by the thermal barrier coatings. Under normal conditions of operation, coated components may be susceptible to various types of damage, including erosion, oxidation, and attack from environmental contaminants.

For turbine components, environmental contaminant compositions of particular concern are those containing oxides of calcium, magnesium, aluminum, silicon, and mixtures thereof; dirt, ash, and dust ingested by gas turbine engines, for instance, are often made up of such compounds. These oxides often combine to form contaminant compositions comprising mixed calcium-magnesium-aluminum-silicon-oxide systems (Ca—Mg—Al—Si—O), hereafter referred to as "CMAS." At the high turbine operating temperatures, these environmental contaminants can adhere to the hot thermal barrier coating surface, and thus cause damage to the thermal barrier coating. For example, CMAS can form compositions that are liquid or molten at the operating temperatures of the turbines. The molten CMAS composition can dissolve the thermal barrier coating, or can fill its porous structure by infiltrating the pores, channels, cracks, or other cavities in the coating. Upon cooling, the infiltrated CMAS composition solidifies and reduces the coating strain tolerance, thus initiating and propagating cracks that may cause delamination and spalling of the coating material. This may further result in partial or complete loss of the thermal protection provided to the underlying metal substrate of the part or component. Further, spallation of the thermal barrier coating may create hot spots in the metal substrate leading to premature component failure. Premature component failure can lead to unscheduled maintenance as well as parts replacement resulting in reduced performance, and increased operating and servicing costs.

Thus, there is a need for improved coating systems that provide protection to thermal barrier coatings from the adverse effects of environmental contaminants, when operated at or exposed to high temperatures. In particular, there is a need for improved coating systems, and methods for making such coatings, that provide protection from the adverse effects of deposited CMAS.

BRIEF DESCRIPTION OF THE INVENTION

Aspects and advantages of the invention will be set forth in part in the following description, or may be obvious from the description, or may be learned through practice of the invention.

A coating system is generally provided that is disposed on a surface of a substrate. In one embodiment, the coating system includes a bond coating on the surface of the substrate, a protective coating on the bond coating, a thermal barrier coating on the protective coating, and a protective agent disposed within at least some of the voids of the thermal barrier coating. Generally, the protective coating is constructed from a ceramic material, and the thermal barrier coating defines a plurality of elongated surface-connected voids. Methods are also generally provided for forming such a coating system.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the term "coating" refers to a material disposed on at least a portion of an underlying surface in a continuous or discontinuous manner. Further, the term "coating" does not necessarily mean a uniform thickness of the disposed material, and the disposed material may have a uniform or a variable thickness. The term "coating" may refer to a single layer of the coating material or may refer to a plurality of layers of the coating material. The coating material may be the same or different in the plurality of layers.

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth.

A coating system is generally provided to protect underlying material (e.g., underlying coating and/or surfaces) from undesired chemical interactions. The coating system generally includes a protective layer between a bond coating and a thermal barrier coating (TBC). The protective layer is meant to protect the underlying bond coating, and particularly any thermally grown oxide on the bond coating, from CMAS attack, from reactive particle attack, or reactive layer attack. The protective coating is particularly useful within coating systems that include a thermal barrier coating defining a plurality of elongated surface-connected voids, such as cracks and porosity that allow access for environmental contaminants to the interior of coating, which provides a path for CMAS attack, reactive particle attack, or a reactive layer attack.

Figure 1:
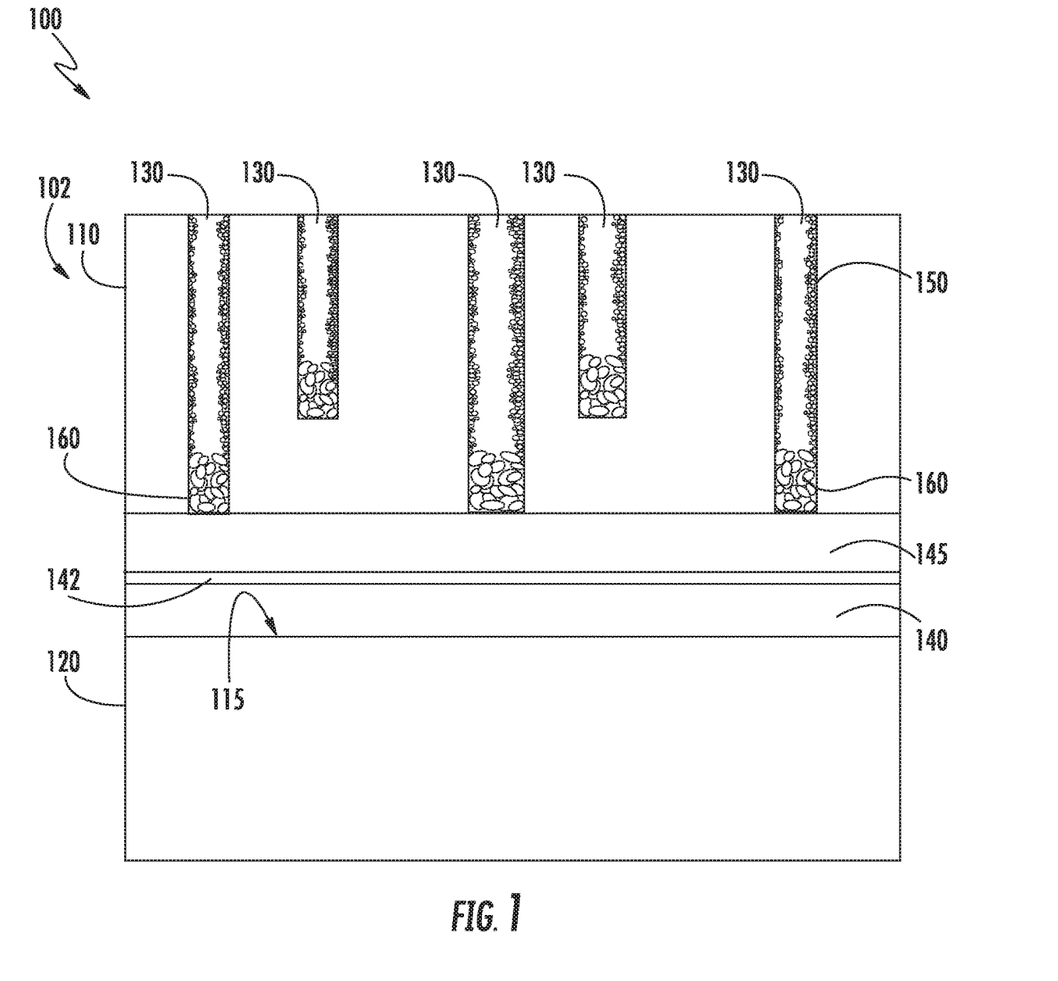
FIG. 1 is a schematic cross-section illustrating one embodiment of the present invention.

Referring to FIG. 1, an article 100 is generally shown including a coating system 102 disposed on a surface 115 of a substrate 120. The coating system 102 generally includes a bond coating 140 on the surface 115 of the substrate 120, a protective coating 145 on the bond coating 140, and a thermal barrier coating 110 on the protective coating 145. The thermal barrier coating generally defines a plurality of elongated surface-connected voids 130, with a protective agent 160 disposed within at least some of the voids 130 of the thermal barrier coating 110. Each of these layers are discussed in greater detail below.

Figure 2:
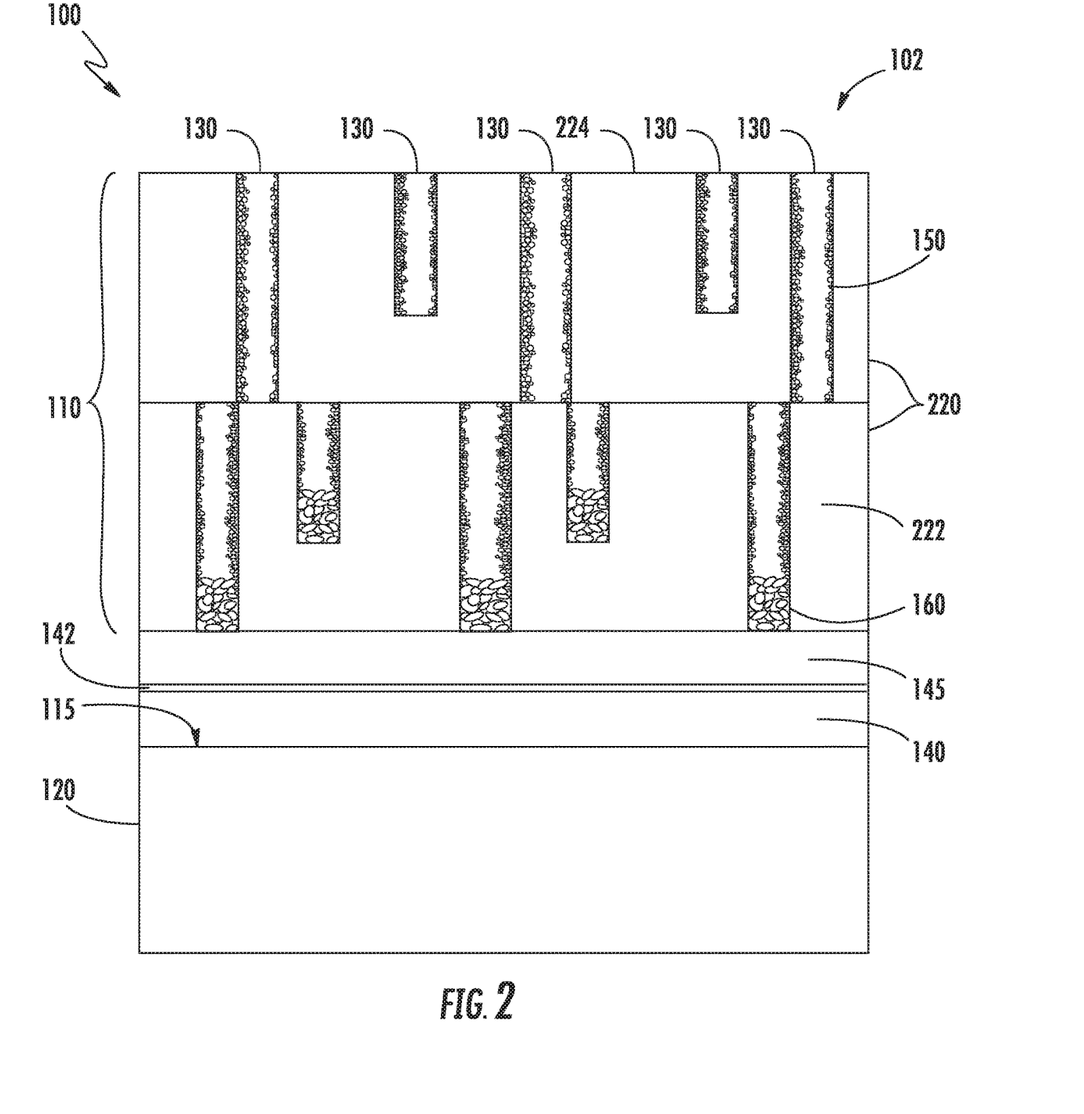
FIG. 2 is a schematic cross-section illustrating another embodiment of the present invention.

As shown in FIGS. 1 and 2, the bond coating 140 is disposed between coating 110 and substrate 120 in some embodiments. Bond coating 140 provides functionality (adhesion promotion and oxidation resistance, for example) similar to what such coatings generally provide in conventional applications. In some embodiments, bond coating 140 comprises an aluminide, such as nickel aluminide or platinum aluminide, or a MCrAlY-type coating well known in the art. These bond coatings may be especially useful when applied to a metallic substrate 120, such as a superalloy. In other embodiments, bond coating 140 comprises a silicide compound or elemental silicon, which are often associated with ceramic-based substrates, such as silicon carbide-reinforced silicon carbide ceramic matrix composites (CMC's). These coatings 140 may be applied using any of various coating techniques known in the art, such as plasma spray, thermal spray, chemical vapor deposition, ion plasma deposition, vapor phase aluminide or physical vapor deposition.

The bond coating 140 may have a thickness of about 2.5 μm to about 400 μm and may be applied as an additive layer to the substrate 120 or may be diffused into the substrate giving an inhomogeneous composition which is engineered to have a gradient in properties. However, it is noted that all coating layers within the coating system 102 can vary in thickness depending on location on the part.

A thermally grown oxide layer 142 is shown on the bond coating 140. Generally, the thermally grown oxide layer 142 includes an oxide of the material of the bond coating 140. For example, when the bond coating 140 includes silicon in its construction, the thermally grown oxide layer 142 may include a silicon oxide (e.g., silicon dioxide, etc.). Similarly, when the bond coating 140 includes aluminum in its construction, the thermally grown oxide layer 142 may include an aluminum oxide (e.g., $Al_2O$, $AlO$, $Al_2O_3$, etc., or mixtures thereof).

In certain embodiments, the thermally grown oxide layer 142 generally has a thickness of up to about 20 μm (e.g., about 0.01 μm to about 6 μm) and can be a natural product of thermal exposures during processing of subsequent layers or can be designed to be thicker by heat treating the part. The TGO layer may not be uniform dependent on the underlying bond coating 140, processing methods, and exposure conditions.

The protective coating 145 generally includes a ceramic thermal barrier material. Suitable ceramic thermal barrier coating materials include various types of oxides, such as hafnium oxide ("hafnia") or zirconium oxide ("zirconia"), in particular stabilized hafnia or stabilized zirconia, and blends including one or both of these. Examples of stabilized zirconia include without limitation yttria-stabilized zirconia, ceria-stabilized zirconia, calcia-stabilized zirconia, scandia-stabilized zirconia, magnesia-stabilized zirconia, india-stabilized zirconia, ytterbia-stabilized zirconia, lanthana-stabilized zirconia, gadolinia-stabilized zirconia, as well as mixtures of such stabilized zirconia. Similar stabilized hafnia compositions are known in the art and suitable for use in embodiments described herein.

In certain embodiments, protective coating 145 includes yttria-stabilized zirconia. Suitable yttria-stabilized zirconia may include from about 1 weight percent to about 20 weight percent yttria (based on the combined weight of yttria and zirconia), and more typically from about 3 weight percent to about 10 weight percent yttria. An example yttria-stabilized zirconia thermal barrier coating includes about 7% yttria and about 93% zirconia. These types of zirconia may further include one or more of a second metal (e.g., a lanthanide or actinide) oxide, such as dysprosia, erbia, europia, gadolinia, neodymia, praseodymia, urania, and hafnia, to further reduce thermal conductivity of the thermal barrier coating material. In some embodiments, the thermal barrier coating material may further include an additional metal oxide, such as, titania.

Suitable ceramic thermal barrier coating materials may also include pyrochlores of general formula $A_2B_2O_7$ where A is a metal having a valence of 3+ or 2+ (e.g., gadolinium, aluminum, cerium, lanthanum or yttrium) and B is a metal having a valence of 4+ or 5+ (e.g., hafnium, titanium, cerium or zirconium) where the sum of the A and B valences is 7. Representative materials of this type include gadolinium zirconate, lanthanum titanate, lanthanum zirconate, yttrium zirconate, lanthanum hafnate, cerium hafnate, and lanthanum cerate.

Protective coating 145 may include the ceramic thermal barrier coating material in an amount of up to 100 weight percent. In some embodiments, the protective coating 145 includes the ceramic thermal barrier coating material in a range from about 95 weight percent to about 100 weight percent and more particularly from about 98 weight percent to about 100 weight percent. The selected composition of protective coating 145 may depend upon one or factors, including the composition of the adjacent bond coating layer 140, the coefficient of thermal expansion (CTE) characteristics desired for protective coating 145, and the thermal barrier properties desired for protective coating 145.

The thickness of protective coating 145 may depend upon the substrate or the component it is deposited on. In particular, the thickness of protective coating 145 may depend upon the thickness of the overlaying thermal barrier coating 110. In some embodiments, the thermal barrier coating 110 is about 4 times to about 8 times thicker than the protective coating 145 (i.e., the protective coating 145 has a thickness that is about $\frac{1}{4}^{th}$ to about $\frac{1}{8}^{th}$ of the thickness of the thermal barrier coating 110) to provide sufficient barrier for the particular thermal barrier coating 110 thereon. For example, with the thermal barrier coating 110 has a thickness of about 25 microns to about 2000 microns, the protective coating 145 may have a thickness of about 4 microns to about 335 microns.

The protective coating 145 may be applied using any of various coating techniques known in the art, such as plasma spray, thermal spray, chemical vapor deposition, or physical vapor deposition.

The structure of the protective layer 145, in particular embodiments, minimizes the access of contaminants through any vertical cracks or connected porosity so that the coating system 102 performs as a barrier to infiltration during processing of the protective agent 150 and/or the barrier 160. In one embodiment, the barrier layer 145 is manufactured with a process that creates equi-axed pores to have less than 30% porosity so as to decrease connected porosity. For example, the protective coating has a density of about 2 g/cm³ to about 6 g/cm³ and/or a porosity of about 0% to about 50%. The viscosity of the processing solution can determine the density/porosity requirements of the protective coating.

Embodiments of the present invention incorporate a coating that includes one or more substances, referred to herein collectively as "protective agents," disposed within spaces in the coating, that is, surface-connected voids such as cracks, pores, voids, and the like, through which molten CMAS typically infiltrate the coating and ultimately degrade it as described previously. A protective agent is designed to be highly reactive to CMAS-type material, such that, at typical temperatures where CMAS is encountered in liquid form, the protective agent rapidly reacts with the CMAS to form a solid reaction product that itself is thermally and chemically stable in the presence of liquid CMAS, forming a solid-phase barrier against further CMAS ingress.

To perform the function described above, a "protective agent" includes a substance that is reactive with CMAS material. More particularly, a substance is considered suitable as a substance for use in the protective agent as described herein if the substance has the characteristic property, that is, the capability, of chemically reacting with a nominal CMAS liquid composition at atmospheric pressure to form a solid, crystalline product that is outside the crystallization field of this nominal CMAS composition. The solid crystalline product has a higher melting temperature than the nominal CMAS composition so that it remains as a solid barrier to liquid infiltration.

For the purposes of this description, the term "nominal CMAS" refers to the following composition, with all percentages in mole percent: 41.6% silica ($SiO_2$), 29.3% calcia (CaO), 12.5% alumina ($AlO_{1.5}$), 9.1% magnesia (MgO), 6.0% iron oxide ($FeO_{1.5}$), and 1.5% nickel oxide (NiO). It will be appreciated that the nominal CMAS composition given in this definition represents a reference composition to define a benchmark for the a substance's CMAS reactivity in a way that can be compared to the CMAS reactivity of other substances; use of this reference composition does not limit in any way the actual composition of ingested material that becomes deposited on the coating during operation which, of course, will vary widely in service.

If a given substance is capable of reacting with molten CMAS having the above nominal composition, thereby forming a reaction product that has a melting point higher than about 1200 degrees Celsius, is crystalline, and is outside the crystallization field of this nominal CMAS composition, then the substance may be useful in the protective agent as described herein. A material is outside the crystallization field of the nominal CMAS composition if it is not included in the set of crystalline phases that can be formed from combinations of the component oxides of the CMAS composition. Thus, a material that includes a rare-earth element, such as ytterbium, for instance, would be outside the crystallization field of the nominal CMAS composition because none of the component oxides of the nominal CMAS includes ytterbium. On the other hand, a reactive agent that exclusively employs one or more of the other components of the nominal CMAS composition, such as aluminum oxide, would not form a product outside the crystallization field of nominal CMAS. Use of a protective agent substance that promotes formation of reaction product with CMAS outside the crystallization field of the CMAS may result in faster reaction kinetics with CMAS under some circumstances, and if reaction kinetics can be accelerated, then ingress of molten CMAS prior to reaction and solidification desirably may be reduced.

Referring again to FIG. 1, the thermal barrier coating 110 is disposed on the protective coating 145 over the bond coating 110 and the substrate 120. The thermal barrier coating 110 includes surface-connected voids 130 such as cracks and porosity that allow access for environmental contaminants to the interior of coating 110. Typically, the voids 130 of highest interest are elongated. That is, the voids 130 have an aspect ratio higher than 1, and are often oriented such that contaminants entering the void 130 can be conducted into the cross-sectional thickness of the coating 130. In some embodiments, voids 130 include substantially vertically oriented (from the perspective of a cross-sectional view as in FIG. 1) cracks and/or boundaries of grains or other microstructural features. These voids 130 may be present due to inherent characteristics of deposition processes used to deposit the coating 110; some voids 130 may also form after deposition due to normal wear and tear during operation.

Thermal barrier coating 110 may be applied by any technique suitable for a given application. Coatings that are deposited by air plasma spray techniques, for instance, may result in a sponge-like porous structure of open pores in at least the surface of the coating. Under certain deposition conditions, well developed, vertically oriented (relative to the plane of the substrate/coating interface) cracks are also formed by plasma spraying thermal barrier coating materials. Similarly, thermal barrier coatings that are deposited by physical—or chemical-vapor deposition techniques may result in a structure including a series of columnar grooves, crevices or channels in at least the surface of the coating. A porous structure, especially (though not exclusively) a structure incorporating vertically oriented and/or columnar features as noted above, may be one of the factors that provides for strain tolerance by the thermal barrier coatings during thermal cycling. Further, the porous structure may provide for stress reduction due to the differences between the coefficient of thermal expansion (CTE) of the coating and the CTE of the underlying bond coat layer/substrate.

Coating 110 generally includes a ceramic thermal barrier material, which may be independently selected from the ceramic material of the protective coating. That is, in certain embodiments, the ceramic material of the protective coating and the thermal barrier coating are substantially identical in terms of chemical composition. However, in other embodiments, the ceramic material of the protective coating and the thermal barrier coating can be different in terms of chemical composition. Suitable ceramic thermal barrier coating materials include various types of oxides, such as hafnium oxide ("hafnia") or zirconium oxide ("zirconia"), in particular stabilized hafnia or stabilized zirconia, and blends including one or both of these. Examples of stabilized zirconia include without limitation yttria-stabilized zirconia, ceria-stabilized zirconia, calcia-stabilized zirconia, scandia-stabilized zirconia, magnesia-stabilized zirconia, india-stabilized zirconia, ytterbia-stabilized zirconia, lanthana-stabilized zirconia, gadolinia-stabilized zirconia, as well as mixtures of such stabilized zirconia. Similar stabilized hafnia compositions are known in the art and suitable for use in embodiments described herein.

In certain embodiments, thermal barrier coating 110 includes yttria-stabilized zirconia. Suitable yttria-stabilized zirconia may include from about 1 weight percent to about 20 weight percent yttria (based on the combined weight of yttria and zirconia), and more typically from about 3 weight percent to about 10 weight percent yttria. An example yttria-stabilized zirconia thermal barrier coating includes about 7% yttria and about 93% zirconia. These types of zirconia may further include one or more of a second metal (e.g., a lanthanide or actinide) oxide, such as dysprosia, erbia, europia, gadolinia, neodymia, praseodymia, urania, and hafnia, to further reduce thermal conductivity of the thermal barrier coating material. In some embodiments, the thermal barrier coating material may further include an additional metal oxide, such as, titania.

Suitable ceramic thermal barrier coating materials may also include pyrochlores of general formula $A_2B_2O_7$ where A is a metal having a valence of 3+ or 2+(e.g., gadolinium, aluminum, cerium, lanthanum or yttrium) and B is a metal having a valence of 4+ or 5+(e.g., hafnium, titanium, cerium or zirconium) where the sum of the A and B valences is 7. Representative materials of this type include gadolinium zirconate, lanthanum titanate, lanthanum zirconate, yttrium zirconate, lanthanum hafnate, cerium hafnate, and lanthanum cerate.

Thermal barrier coating 110 may include the ceramic thermal barrier coating material in an amount of up to 100 weight percent. In some embodiments, the thermal barrier coating 110 includes the ceramic thermal barrier coating material in a range from about 95 weight percent to about 100 weight percent and more particularly from about 98 weight percent to about 100 weight percent. The selected composition of coating 110 may depend upon one or factors, including the composition of the optional, adjacent bond coating layer 140 (if present), the coefficient of thermal expansion (CTE) characteristics desired for coating 110, and the thermal barrier properties desired for coating 110.

The thickness of thermal barrier coating 110 may depend upon the substrate or the component it is deposited on. In some embodiments, coating 110 has a thickness in a range of from about 25 microns to about 2000 microns. In some embodiments, coating 110 has a thickness in a range of from about 25 microns to about 1500 microns. In some embodiments, the thickness is in a range of from about 25 microns to about 1000 microns.

Referring again to FIG. 1, a protective agent 150 is disposed within at least some of the voids 130 of thermal barrier coating 110. Protective agent 150 has the characteristics described above with respect to the reactivity of its component substance(s) with CMAS. In some embodiments, such as the illustrative embodiment shown in FIG. 1, agent 150 decorates the surface of voids 130 in a discrete arrangement, while in other embodiments agent forms a continuous or substantially continuous structure within voids 130. While other techniques have been described in which material is disposed on internal surfaces of ceramic coatings, for instance to prevent sintering of columnar microstructural features, the present technique involves the disposition of an effective concentration of agent 150 to substantially prevent incursion of CMAS, such as the nominal CMAS composition used as a benchmark, above, into voids in which agent 150 is disposed. This effective concentration of protective agent 150 will depend in large part on the specific volume of the reaction product formed between CMAS and the agent 150, and on the microstructure of coating 110. For instance, where the width of voids 130 is comparatively large, or where the volume fraction of voids is comparatively high, the amount of agent 150 needed to be effective in stopping incursion of molten CMAS will be higher than in instances where void width and/or void volume fraction is comparatively low. In certain embodiments, at least about 25% by volume of the void fraction (porosity) of coating 110 is occupied by agent 150. In some embodiments, the volume fraction of the porosity that is occupied by agent 150 is a function of the cross-sectional depth, with a comparatively higher concentrations of agent at or near the coating surface trending to comparatively low concentrations as distance from the coating surface increases (that is, as distance away from substrate 120 decreases). For instance, as an illustrative, non-limiting example, the occupied porosity is at least about 25% by volume at the surface of coating 110, trending toward about 5% by volume at a point below the half-thickness of the coating 110.

As noted previously, protective agent 150 includes one or more substance that is highly reactive with liquid CMAS, and forms a reaction product that can serve as a barrier to prevent further incursion of liquid CMAS into voids 130, thereby helping to maintain strain tolerance of coating 110. Typically, though not necessarily exclusively, protective agent comprises a ceramic material such as an oxide or a nitride. Various types of suitable oxides are described in more detail, below. Examples of suitable nitrides include, but are not limited to, nitrides of tantalum or titanium.

In some embodiments, the protective agent includes a rare-earth oxide, that is, an oxide compound that includes a rare-earth element as one of its constituent elements. As used herein, the terms "rare-earth" and "rare-earth element" are used interchangeably, and encompass elements of the lanthanide series, yttrium, and scandium. For example, in some embodiments, the oxide includes lanthanum, neodymium, erbium, cerium, gadolinium, or combinations including any one or more of these. Certain complex oxides, that is, oxide compounds that include more than one metal element constituent, have been shown in some circumstances to provide comparatively high reactivity with liquid CMAS. In particular embodiments, the oxide is a complex oxide that includes a rare-earth element and a transition metal element, such as zirconium, hafnium, titanium, or niobium, along with combinations of these. Zirconates, hafnates, titanates, and niobates that include lanthanum, neodymium, cerium, and/or gadolinium are examples of such complex oxide. A particular example is gadolinium zirconate, which has been shown, for example, by Kramer, Yang, and Levi at University of California, Santa Barbara, to react with liquid CMAS to form a stable crystalline apatite phase that may serve as a barrier to liquid CMAS incursion, prompting the authors to suggest this material may be useful as a bulk coating material.

Other complex rare-earth compound structures may be useful as a CMAS-reactive substance in the protective agent 150 as described herein. In one embodiment, the substance has a weberite crystal structure. Use of such materials as CMAS-resistant coatings is described in commonly-owned U.S. patent application Ser. No. 14/525,586, filed on 28 Oct. 2014. The weberite structure is an anion-deficient fluorite-related superstructure. Compared with fluorites, the reduction in the number of anions leads to a decrease in the coordination number of the so-called "B cations" (those of VI coordination) with respect to the "A cations" (VIII coordination), thus allowing the accommodation of diverse cations. The term "weberite crystal structure" as used herein refers to crystal structure of a family of materials with the general formulation $A_2B_2X_7$ or $A_3BX_7$, wherein A includes a rare earth metal ion, B includes tantalum (Ta) and/or niobium (Nb), and X comprises oxygen or fluorine. Further details of the structure have been described in "Complex Ceramic Structures I Weberites", Cai et al., *Acta Crystallographica*. Part B, Vol. 63, Part 3, 2009. While several other compounds possess the same stoichiometry (pyrochlores, layered perovskites etc.), the weberite compounds are isomorphous to the fluoride mineral $Na_2MgAlF_7$.

In some embodiments, the substance having a weberite structure comprises a rare-earth element, oxygen, and one or more element selected from the group consisting of tantalum and niobium. In particular embodiments, the substance has a nominal formula $A_3BX_7$, wherein A comprises a rare earth metal element, B comprises tantalum, niobium, or combinations thereof, and X comprises oxygen, fluorine, or combinations thereof. In one example, the substance having a weberite crystal structure includes gadolinium, oxygen, and at least one element selected from the group consisting of tantalum and niobium. As described in the aforementioned patent application, two different weberite oxide ($Gd_3NbO_7$ and $Gd_3TaO_7$) powder compositions were observed to react quickly and completely with liquid CMAS to form a reaction product having a desirably stable apatite-type structure with a nominal composition $Ca_2Gd_8(SiO_4)_6O_2$.

In other embodiments, the protective agent comprises an NZP type material, as described in commonly owned U.S. patent application Ser. No. 14/524,072, filed on 27 Oct. 2014. The term "NZP-type material" as used herein refers to a family of materials having a crystal structure similar to $NaZr_2P_3O_{12}$ (the parent compound from which the name is derived). The NZP materials typically have a three-dimensional "open" framework structure, with $ZrO_6$ octahedra linked to $PO_4$ tetrahedra. In some embodiments, the NZP-type material has a hexagonal structure. As for the other materials described above, NZP-type materials have been described previously as candidates for bulk coatings. In the present description, however, these materials are disposed in the voids 130 of a bulk coating 110.

In one embodiment employing NZP-type material as a substance of the protective agent 150, the substance is a material having formula (I):

$$A_{1-x}B_xZr_{4-y}D_y(PO_4)_z$$

wherein A and B are selected from the group consisting of alkaline earth metals and rare earth metals, D is hafnium or titanium; x is a number from 0 to 1; y is a number from 0 to 4; and z is 3 or 6. Non-limiting examples of suitable alkaline earth metals include beryllium, magnesium, calcium, strontium, barium, or combinations thereof. Non-limiting examples of suitable rare earth metals include scandium, yttrium, lanthanum, cerium, gadolinium, praseodymium, neodymium, promethium, samarium, europium, terbium, dysprosium, holmium, erbium, thulium, ytterbium, lutetium, or combinations thereof.

In some embodiments, the protective agent includes $MZr_4(PO_4)_6$, wherein M includes at least one alkaline earth metal. As noted earlier, M may include beryllium, magnesium, calcium, strontium, barium, or combinations thereof. In certain embodiments, the CMAS-reactive material includes $Ca_xSr_{1-x}Zr_4(PO_4)_6$, wherein x is a number from 0 to 1. In certain embodiments, the CMAS-reactive material includes $CaZr_4(PO_4)_6$, $SrZr_4(PO_4)_6$, $Ca_{0.5}Sr_{0.5}Zr_4(PO_4)_6$, or combinations thereof. As noted in the aforementioned Ser. No. 14/524,072 application, each of these three compositions was observed to react quickly and completely with liquid CMAS, forming stable solid reaction products such as silicates and phosphates that may provide desirable barrier behavior when formed within voids 130 of coating 110.

In other embodiments, the protective agent has a perovskite crystal structure and comprises (a) a rare earth element, (b) tantalum, niobium, or a combination of tantalum and niobium, and (c) oxygen. In one embodiment, the perovskite-structured substance is an oxide having a nominal composition of $AB_3O_9$, where A comprises the rare earth element, and B comprises the niobium, tantalum, or combination of tantalum and niobium. A perovskite-structured oxide of nominal composition $GdTa_3O_9$ is a particular example of such a substance; this composition was observed in a laboratory test to rapidly and completely react with a liquid CMAS composition, forming a desirably solid, dense, blocky crystalline phase that may provide a suitable barrier to liquid CMAS penetration into coating 110.

In other embodiments, the protective agent includes a compound having a scheelite, fergusonite, or wolframite crystal structure, and having a nominal formula $ABX_4$, wherein A comprises a rare-earth element (and, optionally, an alkaline earth element), B comprises tantalum, niobium, or a combination of tantalum and niobium, and X comprises oxygen, nitrogen, or a combination of nitrogen and oxygen. In certain embodiments, A in this formula comprises yttrium, gadolinium, lanthanum, neodymium, ytterbium, or combinations of any of the foregoing. A particular example of such material is $YTaO_4$, which in laboratory tests was observed to react quickly with liquid CMAS to form a stable crystalline solid reaction product.

As is evident from the above description, rare-earth elements are included in the protective agent 150 in many of the various embodiments. While several compounds including these elements may show desirable reactivity with CMAS, there may be certain deleterious effects attributable to the presence of these elements within coating 110. Notably, the present inventors have discovered that where protective agent 150 is disposed at or near the interface between coating 110 and bond coating 140, chemical interaction between the rare-earth-bearing protective agent and an oxide formed by the bond coating at elevated temperature—known as a thermally-grown oxide, or TGO—can result in premature spalling of coating 110.

To mitigate this potential issue, the protective coating 145 is disposed on the bond coating 140, together with an optional barrier agent 160, to substantially separate protective agent 150 from the bond coating 140 or, if no bond coating is present, from substrate 120. Thus, the protective coating 145 and optional barrier agent 160 is interposed between substrate 120 and protective agent 150. As such, the protective coating 145, and optional barrier agent 160, substantially prevents chemical interaction between protective agent 150 and a TGO disposed on substrate 120 or, if present, bond coating 140. When present, the barrier agent 160 comprises aluminum oxide, cerium oxide, yttrium oxide, zirconium oxide, hafnium oxide, tantalum oxide, niobium oxide, titanium oxide, or combinations thereof. Some of these oxides may, where appropriate, include a sufficient amount of stabilizer (often a rare earth element) to reduce propensity of the oxide to undergo stress-generating phase transformations during heat-up and cool-down, but the amount of rare-earth stabilizer should be sufficiently small to mitigate issues of reactivity with the aforementioned TGO. The upper limit of rare-earth stabilizer content depends on the particular element being used and the identity of the barrier agent 160; for example, rare earth bearing aluminate garnets tend not to dissolve alumina, and thus may contain higher amounts of rare earth material without deleterious interaction with TGO. In some embodiments, barrier agent 160 comprises less than about 40 atomic percent rare earth element content. In certain embodiments barrier agent comprises less than about 10 atomic percent rare earth element content, for example as found in the commonly used zirconia stabilized with 8 mole percent yttria ("8YSZ"). The barrier agent material need not be as reactive with CMAS as protective agent 150, because it is typically separated from contact with CMAS by protective agent; the function of barrier agent, then is primarily to physically separate protective agent 150 from bond coating 140 and/or substrate 120.

Coating 110 is shown in FIG. 1 as a single layer, but in some embodiments, such as that illustrated in FIG. 2, coating 110 comprises a plurality of layers 220. In the embodiment illustrated in FIG. 2, coating 110 includes a first layer 222, comprising a first material, and a second layer 224 comprising a second material. First layer 222 is disposed between second layer 224 and substrate 120. The second material is resistant to CMAS infiltration. A material is considered "resistant to CMAS infiltration" in this context if it is more resistant, relative to 8 mole percent yttria stabilized zirconia ("8YSZ" as noted above), to infiltration by liquid CMAS having the nominal CMAS composition described previously herein at a temperature of 1300 degrees Celsius. Similarly to what has been noted previously, it will be appreciated that the 1300 degree Celsius temperature and the nominal CMAS composition given in this definition represent a reference temperature and a reference composition to define a benchmark for the material's CMAS resistance in a way that can be compared to the CMAS resistance of 8YSZ; use of these reference values does not limit in any way the actual temperature at which article 100 may operate or the actual composition of ingested material that becomes deposited on the coating during operation, both of which, of course, will vary widely in service.

Many different materials have been described in the art as providing enhanced CMAS protection relative to yttria-stabilized zirconia and other standard TBC materials, and any of these materials may be considered for use in second layer 222 described above. In one embodiment, the second material includes an oxide. Oxides that include one or more transition metal elements, rare-earth elements, silicon, and/or indium have been described in the art as being resistant to CMAS. In one embodiment, the oxide includes zirconium, hafnium, or combinations thereof. Zirconia, hafnia, and/or titania materials stabilized with one or more rare-earth elements have been described in the art of CMAS-resistant coatings. Examples of such materials include coatings containing gadolinia and zirconia, such as gadolinia-stabilized zirconia; and coatings containing mixtures of gadolinia and hafnia. Examples of other potentially suitable oxide materials include pyrochlores, such as lanthanum zirconate; garnets, such as those described in U.S. Pat. No. 7,722,959; and oxyapatites, such as those described in U.S. Pat. No. 7,722,959. Sodium-containing oxides, such as sodium oxide, sodium silicate, and sodium titanate, are other examples of CMAS resistant oxide materials.

In one particular example, the second material includes yttria-stabilized zirconia (YSZ) having higher yttria content (relative to the overall YSZ content) than typical 8YSZ. Generally, the yttria content in this example is greater than 38 weight percent, and in specific embodiments the yttria content is at least about 55 weight percent. Coatings as described herein using YSZ with yttria content greater than 38 weight percent were superior in CMAS resistance to coatings made with lower-yttria YSZ materials.

Other materials besides oxides have been described for use in resisting CMAS, and are also considered as potentially useful as second materials in second layer 222. Examples of such alternative materials include carbides (such as silicon carbide, tantalum carbide, titanium carbide, and others), nitrides (such as silicon nitride, zirconium nitride, tantalum nitride, boron nitride, and others), and silicides (such as chromium silicide, molybdenum silicide, tantalum silicide, titanium silicide, and others).

Protective agent 150 is distributed within surface-connected coating voids 130 as described previously, and in the context of embodiments involving multiple layers 220 (FIG. 2), the protective agent 150 is, in some embodiments, disposed in just a portion of the layers 220, such as in second layer 224 only, or first layer 222 only; while in certain embodiments, such as the example illustrated in FIG. 2, protective agent 150 is disposed in all layers 220. Barrier agent 160 similarly may be disposed in one or more layers 220; in embodiments such as that illustrated in FIG. 2, barrier agent 160 is disposed in first layer 222 to protect bond coating 140 and/or substrate 120 from interaction with protective agent 150.

One potential advantage of the technique described herein is that it allows the use of an outermost layer, such as layer 222, that has desirable wear, erosion, thermal, or other properties, while disposing CMAS resistant material (i.e., protective agent 150) in the places where it is most needed. Many of the materials that are highly reactive with CMAS lack suitable levels of mechanical properties or other properties to be desirable choices for a bulk coating that is exposed to the ambient service environment of, for instance, a gas turbine. On the other hand, zirconia stabilized with 7%-9% yttria by weight is a very attractive material for use in thermal barrier coatings because of its advantageous thermal and mechanical properties, but its resistance to CMAS is not particularly high. The life of such a coating material may be enhanced by applying protective agent 150 to vulnerable areas (such as the surface-connected voids 130 as noted herein) without resorting to the use of a bulk topcoat made of a CMAS-resistant material, which may itself be more vulnerable than YSZ to erosion or other degradation mechanism.

A method for making articles such as article 100 includes disposing protective agent 150 within surface connected voids 130 of thermal barrier coating 110, positioned on a protective coating 145 and an optional bond coating 140, at an effective concentration to substantially prevent incursion of CMAS materials, such as nominal CMAS noted above, into voids 130 in which agent 150 is disposed.

As noted previously, coating 110 may be disposed on substrate 120 by any of several different coating techniques, such as plasma spray techniques (for example, air plasma spray using dry or liquid feedstock materials), chemical vapor deposition, physical vapor deposition (for example, electron-beam physical vapor deposition or evaporation), slurry deposition, sol-gel techniques, and other coating methods.

Disposing the protective agent typically involves infiltrating an existing coating 110 with a vapor or liquid into the surface-connected voids 130 of the coating 110. In the case of a vapor infiltrant, protective agent 150 may be formed by chemical interaction with the environment within voids 130 such as by reaction with material of coating 110. Liquid infiltrants, on the other hand, include one or more liquids such as water, or a carbon-bearing liquid such as an alcohol or acetone. In one embodiment involving a liquid infiltrant, the liquid includes a carrier fluid and a plurality of particles suspended within the carrier fluid. The particles may comprise the protective agent 150 composition, or may be a chemical precursor to this composition, designed to further react during processing or during service to produce protective agent 150. In an alternative embodiment, the liquid includes a solvent, with a solute dissolved in the solvent. The solute may be a precursor of protective agent 150, such as a nitrate, sulfate, other salt, or other compound type, and the solvent is selected to appropriately accommodate the desired solute. More than one solute may be dissolved in the solvent. The solute may be reacted to form agent 150, such as by heating to decompose the solute, or by reacting multiple solutes together, or by reacting one or more solute with the material of coating 110, or some combination of these.

The liquid infiltrant is infiltrated into the surface-connected voids 130 using any appropriate technique. In some embodiments, the liquid is simply placed in contact with coating 110, such as by dipping or brushing, allowing capillary action to draw the liquid and agent 150 (or precursor thereof) into the voids 130. Vacuum infiltration techniques are applied in some embodiments to further assist in driving liquid into coating 110. Other techniques such as electrophoretic deposition may be used in conjunction with a suspension to deposit particles of agent or a precursor of agent 150 into voids 130. Use of electrophoretic deposition to deposit material within the voids of a ceramic coating is described by Hasz in U.S. Pat. No. 7,780,832.

Where a liquid infiltrant is applied, whether the liquid is carrying a suspension of particles or has a solute dissolved in it, in some embodiments the method further includes volatilizing the liquid to form a residue that is disposed in voids 130. The residue may be a precursor to agent 150, or it may be the agent composition itself. Volatilizing is typically done by heating the infiltrated coating to a temperature where the liquid is driven off at an acceptable rate. Often the heating rate ("ramp-rate") to attain the desired temperature for volatilization is controlled to avoid building up undue pressure within the coating, which could damage the coating and/or could result in incomplete deposition of protective agent due to liquid being forced out by rapid bubble formation and escape.

In some embodiments, the method further includes interposing barrier agent 160 between protective agent 150 and substrate 120, for instance by disposing barrier agent 150 within pores 130 where bond coating 140 and coating 110 meet. This disposition of barrier agent may be accomplished by any means, such as those described above for disposing protective agent 150. In some embodiments, a suspension of particles comprising the desired barrier agent composition, such as aluminum oxide, cerium oxide, zirconium oxide, hafnium oxide, tantalum oxide, niobium oxide, titanium oxide, or combinations thereof, is infiltrated into the voids 130 of coating. The liquid portion of this suspension is volatilized, and then the protective agent is disposed as described above. In alternative embodiments, a liquid solution of a precursor of the barrier agent is infiltrated into coating 110, the liquid is driven off, leaving a residue within the voids 130 that is later reacted to form the barrier agent. This reaction can occur prior to, during, or after disposition of the protective agent, depending on the desired processing and materials distribution.

Other techniques may be applied to provide barrier agent 160 or to otherwise protect substrate 120 or bond coating 140 from interacting with protective agent 150. In one embodiment, an initial layer of coating 110 is applied, such as by electron-beam physical vapor deposition (EBPVD). This initial layer is infiltrated as described above to deposit barrier agent 160 within voids (such as between columns) of this initial layer of coating 110. The infiltrated layer is then cleaned and coated with a subsequent layer of coating 110. This subsequent layer may be the same material as used in the initial layer, or may be a different material, as noted above for the structure described in FIG. 2. The subsequent layer is then infiltrated and processed to dispose protective agent 150 within its voids 130. In another embodiment, an initial layer of coating is deposited using a deposition technique that provides a comparatively high density coating. This dense initial layer may have sufficient density to serve as a barrier between protective agent 150 and substrate 120 or bond coating 140. A subsequent technique or change in deposition parameters may then be applied to deposit a subsequent layer of comparatively porous material over the initial comparatively dense layer. This subsequent layer is then subjected to infiltration and further processing to dispose protective agent 150 within its voids 130.

The coating system 102 is generally disposed on a surface 115 of the substrate 120 to form an article 100. In particular embodiments, the article 100 may be any component that is subject to service in a high-temperature environment, such as a component of a gas turbine assembly. Examples of such components include, but are not limited to, components that include turbine airfoils such as blades and vanes, and combustion components such as liners and transition pieces. Substrate 120, then, may be any material suitable for use in such applications; examples include nickel-base superalloys, cobalt-base superalloys, and ceramic matrix composites, to name a few.

For example, referring to FIG. 3, a schematic partially cross-sectioned side view of an exemplary high by-pass turbofan jet engine 10 ("turbofan 10") is generally shown, and may incorporate various embodiments of the present invention. Although further described below with reference to a turbofan engine 10, the present disclosure is also applicable to turbomachinery in general, including turbojet, turboprop and turboshaft gas turbine engines, including industrial and marine gas turbine engines and auxiliary power units.

As shown in FIG. 1, the turbofan 10 has a longitudinal or axial centerline axis 12 that extends there through for reference purposes. In general, the turbofan 10 may include a fan assembly 14 and a core turbine engine or gas turbine engine 16 disposed downstream from the fan assembly 14.

The gas turbine engine 16 may generally include a substantially tubular outer casing 18 that defines an annular inlet 20. The outer casing 18 encases or at least partially forms, in serial flow relationship, a compressor section having a booster or low pressure (LP) compressor 22, a high pressure (HP) compressor 24, a combustion section 26, a turbine section including a high pressure (HP) turbine 28, a low pressure (LP) turbine 30 and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 via a reduction gear 40 such as in an indirect-drive or geared-drive configuration.

As shown in FIG. 3, the fan assembly 14 includes a plurality of fan blades 42 that are coupled to and that extend radially outwardly from the fan shaft 38. An annular fan casing or nacelle 44 circumferentially surrounds the fan assembly 14 and/or at least a portion of the gas turbine engine 16. It should be appreciated by those of ordinary skill in the art that the nacelle 44 may be configured to be supported relative to the gas turbine engine 16 by a plurality of circumferentially-spaced outlet guide vanes or struts 46. Moreover, at least a portion of the nacelle 44 may extend over an outer portion of the gas turbine engine 16 so as to define a bypass airflow passage 48 therebetween.

During operation of the turbofan 10, a volume of air as indicated schematically by arrows 74 enters the turbofan 10 through an associated inlet 76 of the nacelle 44 and/or fan assembly 14. As the air 74 passes across the fan blades 42 a portion of the air as indicated schematically by arrows 78 is directed or routed into the bypass airflow passage 48 while another portion of the air as indicated schematically by arrow 80 is directed or routed into the LP compressor 22. Air 80 is progressively compressed as it flows through the LP and HP compressors 22, 24 towards the combustion section 26. There, combustion gases 86 are generated in the combustion chamber 62 and flow from the combustor section 26 into the HP turbine 28, causing the HP rotor shaft 34 to rotate, thereby supporting operation of the HP compressor 24. As shown in FIG. 3, the combustion gases 86 are then routed through the LP turbine 30, thus causing the LP rotor shaft 36 to rotate, thereby supporting operation of the LP compressor 22 and/or rotation of the fan shaft 38. The combustion gases 86 are then exhausted through the jet exhaust nozzle section 32 of the gas turbine engine 16 to provide propulsive thrust.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A coating system disposed on a surface of a substrate, the coating system comprising:
    a bond coating on the surface of the substrate;
    a protective coating on the bond coating, wherein the protective coating comprises a ceramic material;
    a thermal barrier coating on the protective coating, wherein the thermal barrier coating defines a plurality of elongated surface-connected voids;
    a barrier agent disposed within at least some of the voids of the thermal barrier coating; and
    a protective agent disposed within at least some of the voids of the thermal barrier coating, wherein the barrier agent is interposed between the substrate and the protective agent, wherein the protective agent comprises an oxide having the nominal formula $A_{1-x}B_xZr_{4-y}D_y(PO_4)_z$, wherein A and B are selected from the group consisting of alkaline earth metals and rare earth metals, D is hafnium or titanium, x is a number from 0 to 1; y is a number from 0 to 4; and z is 3 or 6.

2. The coating system as in claim 1, wherein the ceramic material comprises hafnium oxide, zirconium oxide, or a mixture thereof.

3. The coating system as in claim 1, wherein the ceramic material comprises a stabilized hafnium oxide, a stabilized zirconium oxide, or a mixture thereof.

4. The coating system as in claim 1, wherein the ceramic material comprises a yttria-stabilized zirconia, a ceria-stabilized zirconia, a calcia-stabilized zirconia, a scandia-stabilized zirconia, a magnesia-stabilized zirconia, an india-stabilized zirconia, an ytterbia-stabilized zirconia, a lanthana-stabilized zirconia, a gadolinia-stabilized zirconia, or a mixture thereof.

5. The coating system as in claim 1, wherein the thermal barrier coating has a thickness of about 25 microns to about 2000 microns.

6. The coating system as in claim 5, wherein the protective coating has a thickness that is about $\frac{1}{4}^{th}$ to about $\frac{1}{8}^{th}$ of the thickness of the thermal barrier coating.

7. The coating system as in claim 1, wherein the protective coating has a density of about 2 g/cm$^3$ to about 6 g/cm$^3$.

8. The coating system as in claim 1, wherein the protective coating has a porosity of about 0% to about 50%.

9. The coating system as in claim 1, further comprising:
    a thermally grown oxide on the bond coating, wherein the thermally grown oxide is positioned between the bond coating and the protective coating.

10. The coating system as in claim 9, wherein the protective coating and the barrier agent inhibits chemical interaction between the protective agent and the thermally grown oxide.

11. The coating system as in claim 1, wherein the barrier agent comprises an oxide, wherein the oxide comprises aluminum oxide, cerium oxide, yttrium oxide, zirconium oxide, hafnium oxide, tantalum oxide, niobium oxide, titanium oxide, or combinations thereof.

12. The coating system as in claim 11, wherein the barrier agent further comprises a stabilizer.

13. The coating system as in claim 12, wherein the stabilizer comprises a rare earth element.

14. The coating system as in claim 13, wherein the stabilizer comprises less than 40 atomic % of the rare earth element.

15. A coating system disposed on a surface of a substrate, the coating system comprising:
    a bond coating on the surface of the substrate;
    a protective coating on the bond coating, wherein the protective coating comprises a ceramic material;
    a thermal barrier coating on the protective coating, wherein the thermal barrier coating defines a plurality of elongated surface-connected voids;
    a barrier agent disposed within at least some of the voids of the thermal barrier coating; and
    a protective agent disposed within at least some of the voids of the thermal barrier coating, wherein the barrier agent is interposed between the substrate and the protective agent, wherein the protective agent comprises $MZr_4(PO_4)_6$, wherein M comprises at least one alkaline earth metal.

\* \* \* \* \*